US005622471A

United States Patent [19]

Sommer, Jr. et al.

[11] Patent Number: 5,622,471

[45] Date of Patent: Apr. 22, 1997

[54] METHOD AND APPARATUS FOR OPENING AND EMPTYING BAGS CONTAINING RECYCLABLE MATERIALS

[75] Inventors: Edward J. Sommer, Jr., Nashville; Ronald A. Quarles, Nolensville, both of Tenn.

[73] Assignee: National Recovery Technologies, Inc., Nashville, Tenn.

[21] Appl. No.: 449,836

[22] Filed: May 24, 1995

Related U.S. Application Data

[63] Continuation of Ser. No. 104,273, Aug. 12, 1993, Pat. No. 5,419,670, which is a continuation of Ser. No. 790,188, Nov. 8, 1991, abandoned.

[51] Int. Cl.$^6$ .................................................... B65G 47/34

[52] U.S. Cl. .................. 414/786; 414/412; 241/DIG. 38

[58] Field of Search .................................... 414/411, 412, 414/786; 53/384.1; 493/189, 199, 203, 341; 83/15–16, 27, 168, 171, 407, 425, 425.2, 425.3, 923; 241/23, 65–66, 166, 287, 288, DIG. 38

[56] References Cited

U.S. PATENT DOCUMENTS

| | | | |
|---|---|---|---|
| 2,623,586 | 12/1952 | Volpi | 164/39 |
| 2,736,257 | 2/1956 | Stephenson | 101/8 |
| 3,054,441 | 9/1962 | Gex et al. | 156/515 |
| 3,146,283 | 8/1964 | Da Valle | 264/156 |
| 3,251,252 | 5/1966 | Lefevre | 83/16 |
| 3,406,612 | 10/1968 | Terzuoli | 83/171 X |
| 3,415,147 | 12/1968 | Frydryk | 83/171 |
| 3,891,105 | 6/1975 | Cerroni | 414/412 |
| 3,901,110 | 8/1975 | Priestly | 83/171 |
| 4,034,868 | 7/1977 | Rowland, Jr. | 414/411 X |
| 4,051,754 | 10/1977 | Harcuba et al. | 83/124 |
| 4,123,954 | 11/1978 | Kolosov | 83/171 |
| 4,160,894 | 7/1979 | Stemmler et al. | 493/341 X |
| 4,207,021 | 6/1980 | Burdett, Jr. | 414/412 |
| 4,215,607 | 8/1980 | Hudson et al. | 83/111 |
| 4,344,268 | 8/1982 | Wakamatsu et al. | 53/384 |
| 4,515,509 | 5/1985 | Frisz | 414/412 |
| 4,653,362 | 3/1987 | Gerber | 83/16 |
| 4,699,678 | 10/1987 | Mims | 156/88 |
| 4,718,559 | 1/1988 | Kenny et al. | 209/571 |
| 4,725,184 | 2/1988 | Bennison | 414/412 |
| 4,798,508 | 1/1989 | Lewis | 414/412 |
| 4,813,211 | 3/1989 | Treiber | 53/441 |
| 4,995,770 | 2/1991 | Crane | 414/412 |
| 5,002,451 | 3/1991 | Hale et al. | 414/412 |
| 5,074,951 | 12/1991 | Banco et al. | 83/171 X |
| 5,101,094 | 3/1992 | Keller et al. | 83/171 X |
| 5,163,627 | 11/1992 | Bouche | 241/23 |
| 5,188,500 | 2/1993 | Eide et al. | 414/412 |
| 5,262,617 | 11/1993 | Higashiguchi | 83/168 X |

*Primary Examiner*—James W. Keenan
*Attorney, Agent, or Firm*—Foley & Lardner

[57] ABSTRACT

A bag opener for opening bags containing recyclable materials includes a source of heat sufficient to melt the bags and an assembly that brings the bags into the vicinity of the source of heat to open the bags. In a preferred embodiment the source of heat includes a heated member and the assembly brings the bags into contact with the heated member to open the bags.

2 Claims, 16 Drawing Sheets

METHOD AND APPARATUS FOR OPENING AND EMPTYING BAGS CONTAINING RECYCLABLE MATERIALS

This application is a continuation, of application Ser. No. 08/104,273, filed Aug. 12, 1993, now U.S. Pat. No. 5,419,670, which is a continuation application of Ser. No. 07/790,188 filed Nov. 8, 1991 abandoned.

BACKGROUND OF THE INVENTION

The invention is directed to a method and apparatus for opening and emptying bags that contain recyclable materials prior to recovery of the recyclable materials.

Operators of facilities that process municipal solid waste (MSW), curbside collected recyclable materials, and other bagged waste materials have long noted the need for a machine that automatically opens and empties plastic trash bags. Contained within these plastic trash bags are typical household and commercial wastes, including valuable recyclable materials such as aluminum and steel cans, glass beverage containers, plastic containers, cardboard, and newspaper.

These plastic bags must be opened and emptied to permit sorting of the contents for recycling, composting, incineration, and/or other waste utilization or waste disposal treatment.

The ability to open and empty plastic bags automatically has several advantages over manual opening. Automatic opening reduces labor costs. Automatic opening also increases worker safety by reducing human contact with the unknown contents of a bag, such as hypodermic needles, broken glass, razor blades, and the like.

Mechanical systems exist which automatically open and/or empty plastic bags. Examples of these systems are illustrated in U.S. Pat. No. 4,533,053, issued to Kenny et al.; U.S. Pat. No. 4,533,054, issued to Sommer, Jr. et al.; U.S. Pat. No. 5,002,451, issued to Hale et al.; U.S. Pat. No. 4,995,770, issued to Crane; U.S. Pat. No. 4,798,508, issued to Lewis; U.S. Pat. No. 4,725,184, issued to Bennison; U.S. Pat. No. 4,515,509, issued to Frisz; and U.S. Pat. No. 4,344,268, issued to Wakamatsu et al..

These mechanical systems operate by exerting a dynamic force or a combination of dynamic forces on the bags by, for example, ripping, tearing, dropping, and/or breaking, to cause the bags to tear or otherwise rupture.

Unfortunately, these conventional systems damage the recyclable materials inside of the bags. This makes subsequent recovery of the contents of the bags difficult or impossible as a practical matter. For example, these conventional mechanical systems cause a great deal of glass breakage. The resulting shards of glass become embedded in paper, cardboard, textiles, and other materials, making these materials less valuable and/or less recoverable for recycling. The broken glass also gets into food wastes making production of a food waste compost product more difficult. The different colored broken glass becomes intermixed and therefore unrecoverable for the purpose of recycling the glass back into containers. Similar difficulties exist with other types of potentially recoverable materials when conventional opening and emptying devices are used.

SUMMARY OF THE INVENTION

It is an object of the invention, therefore, to provide a technique to open bags containing recyclable materials that does not rely on mechanical destruction of the bags.

It is another object of the invention to provide a technique for opening bags that permits as much recovery of the contents of the bags as possible.

It is yet another object of the invention to provide a technique for opening and emptying bags that provides partial separation of waste materials by size and/or type.

According to a first aspect of the invention there is provided a bag opener for opening bags. The bag opener includes a source of heat sufficient to melt the bags and an assembly that brings the bags into the vicinity of the source of heat to open the bags. The source of heat can be a heated member, a heated wire, a source of concentrated electromagnetic radiation, a source of concentrated infrared radiation, or a source of hot fluid.

According to a second aspect of the invention there is provided a bag opener which includes at least one heated member at a temperature sufficient to melt a bag and a conveyor that brings the bag into contact with the heated member to open the bag.

According to a third aspect of the invention there is provided a bag opener which includes a first opening station having a source of heat sufficient to melt a bag and a second opening station having a source of heat sufficient to melt the bag. A conveyor first conveys the bag past the source of heat of the first opening station to open a first portion of the bag and then conveys the bag past the source of heat of the second opening station to open a second portion of the bag.

According to a fourth aspect of the invention there is provided a bag emptier for emptying recyclable waste from bags. The bag emptier includes a vibrator and a first ramp vibrated by the vibrator such that waste travels along the first ramp in a first direction. A second ramp is located parallel to the first ramp and is vibrated by the vibrator such that waste travels along the second ramp in the first direction. The first ramp and the second ramp form a space therebetween which increases along the first direction.

According to a fifth aspect of the invention there is provided a bag emptier for emptying and partially sorting recyclable waste from bags. The bag emptier includes a vibrator and a series of ramps vibrated by the vibrator such that waste travels along the series of ramps in a first direction. Adjacent ramps of the series of ramps form a space therebetween such that smaller waste falls in between adjacent ramps while larger waste falls off of the ends of the series of ramps.

Other objects, features, and advantages of the invention will be apparent from the detailed description set forth below.

BRIEF DESCRIPTION OF THE DRAWINGS

The invention will be described in further detail below with reference to the accompanying drawings, wherein.

DETAILED DESCRIPTION OF PREFERRED EMBODIMENTS

Figure 1A:
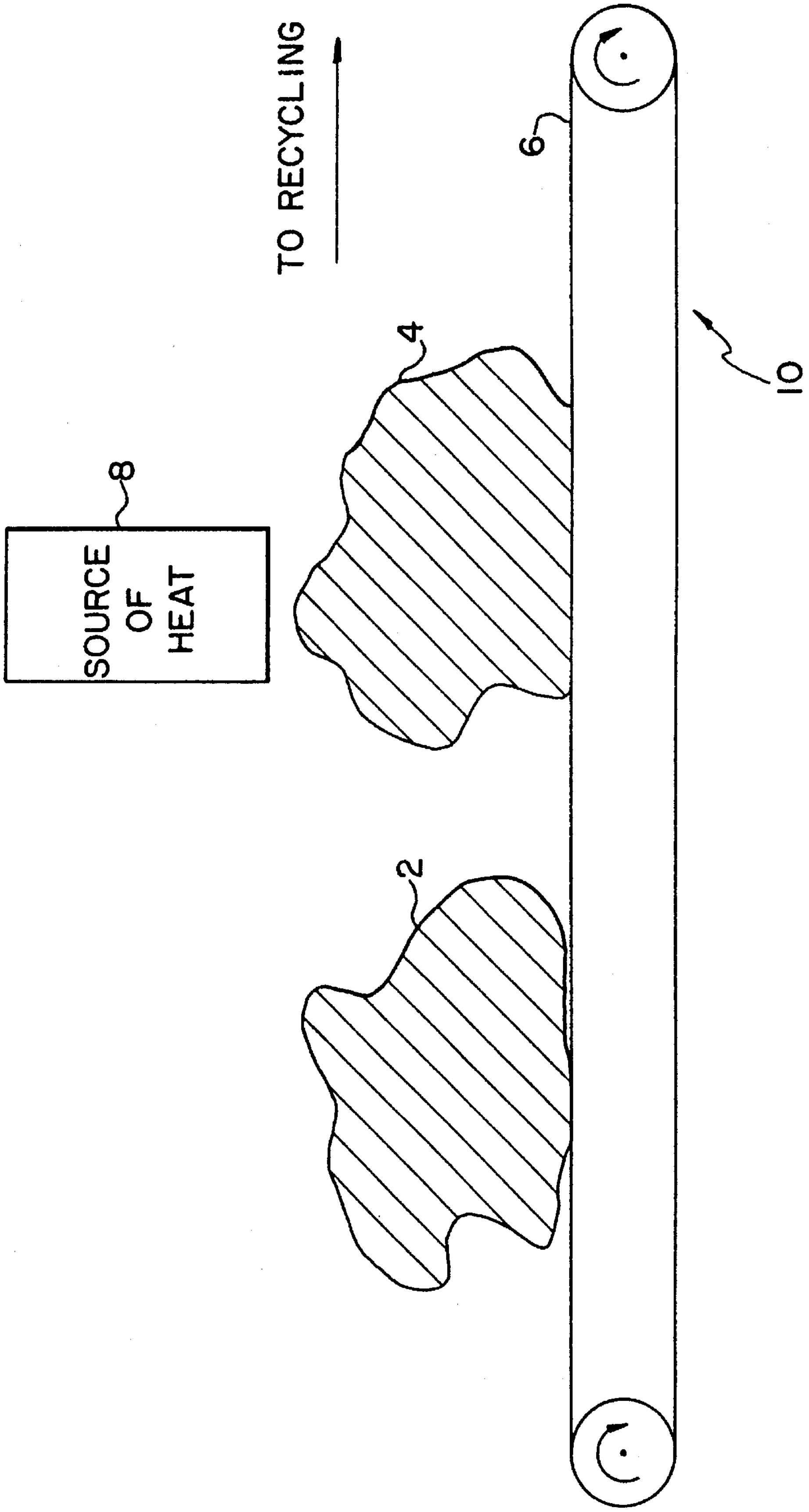
FIGS. 1(*a*) to 1(*f*) illustrate side views of bag openers according to preferred embodiments of the invention.
Figure 1B:
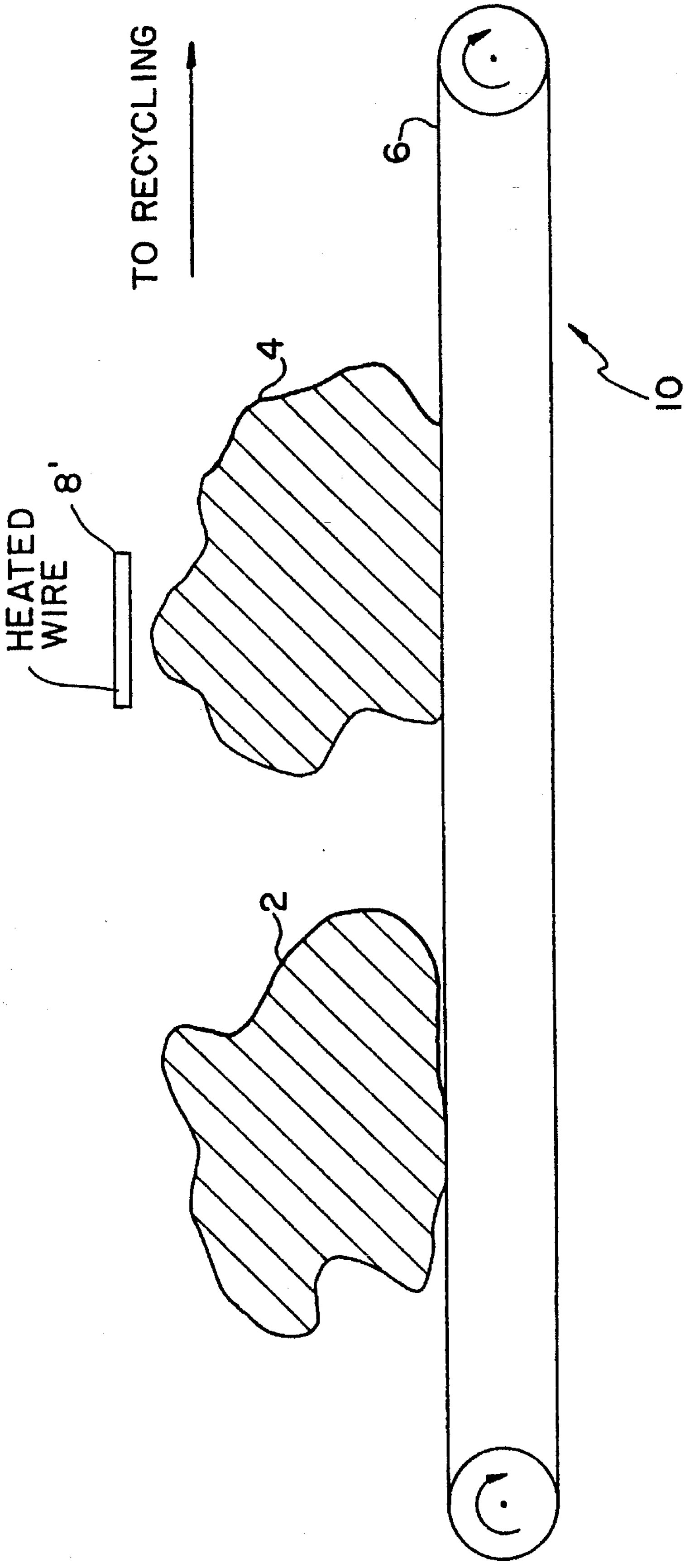
Figure 1C:
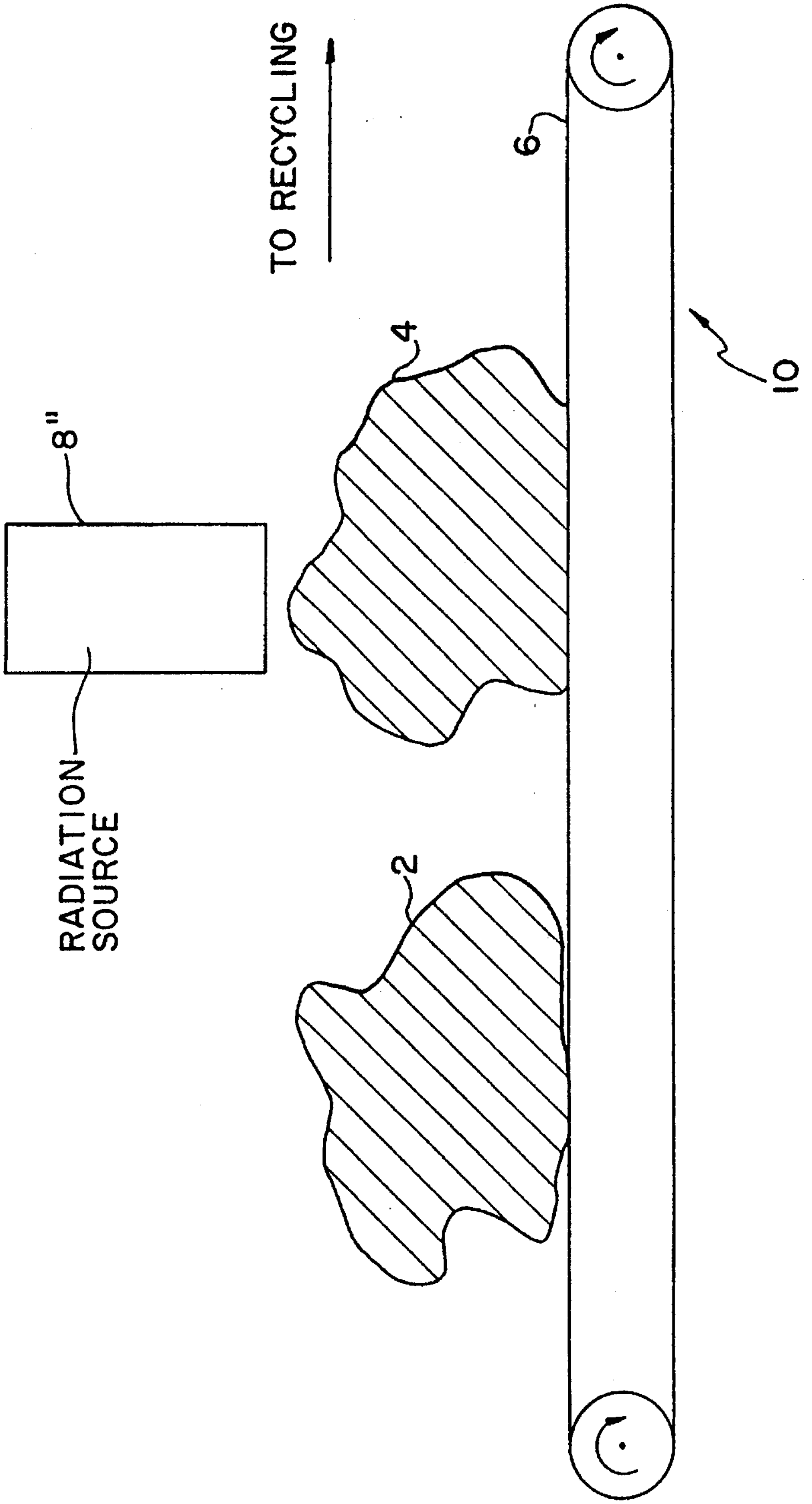
Figure 1D:
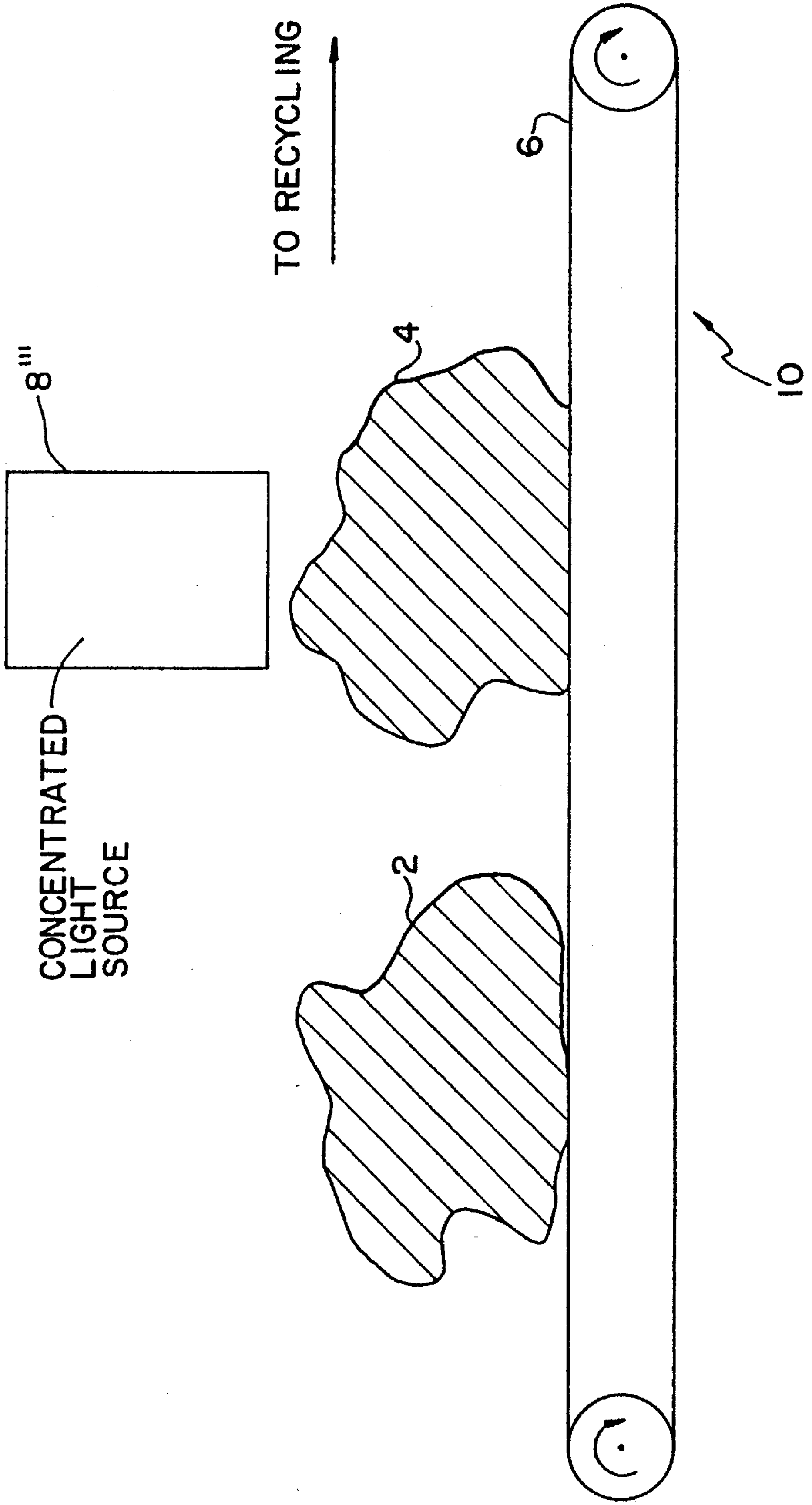
Figure 1E:
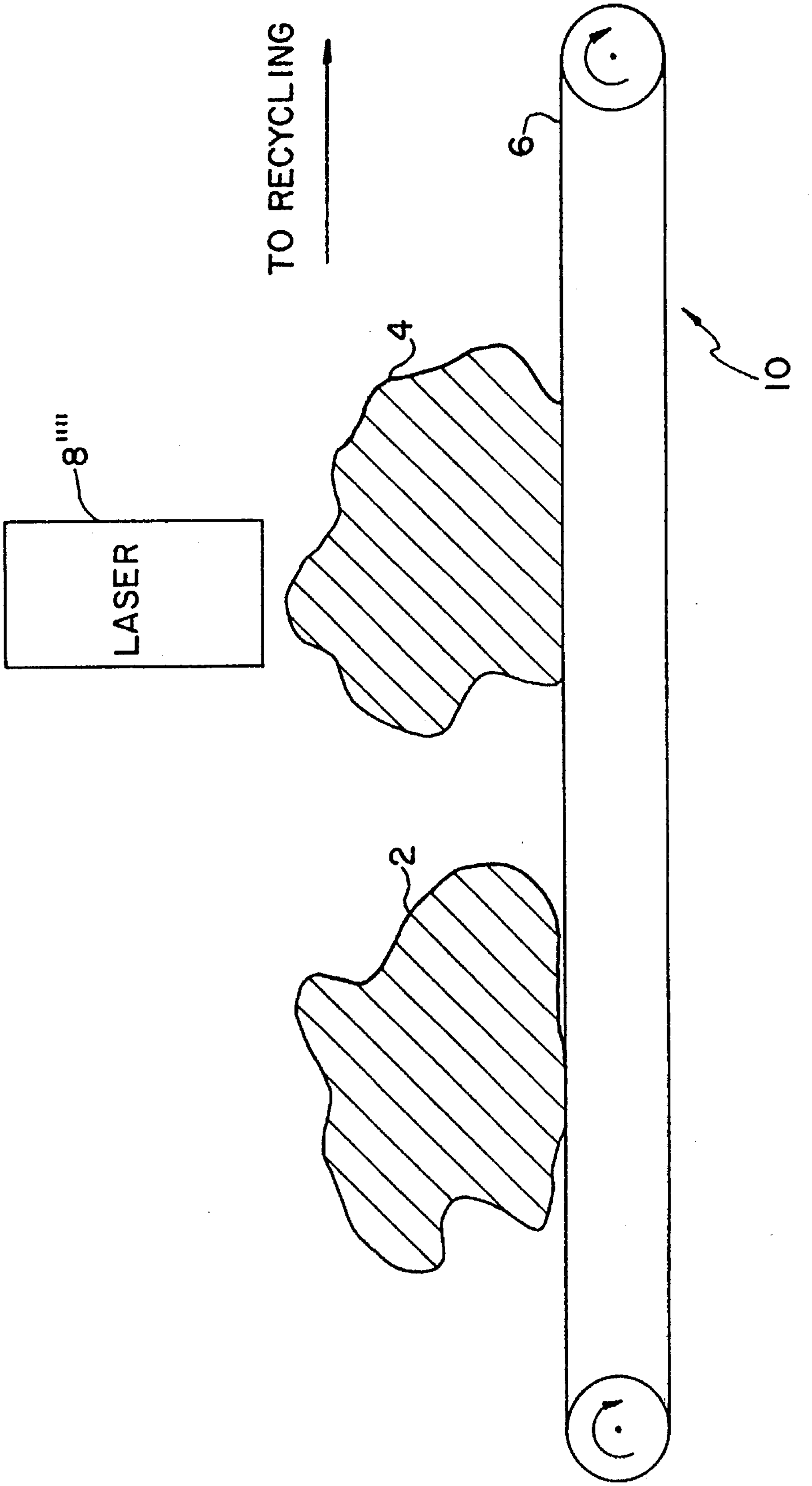
Figure 1F:
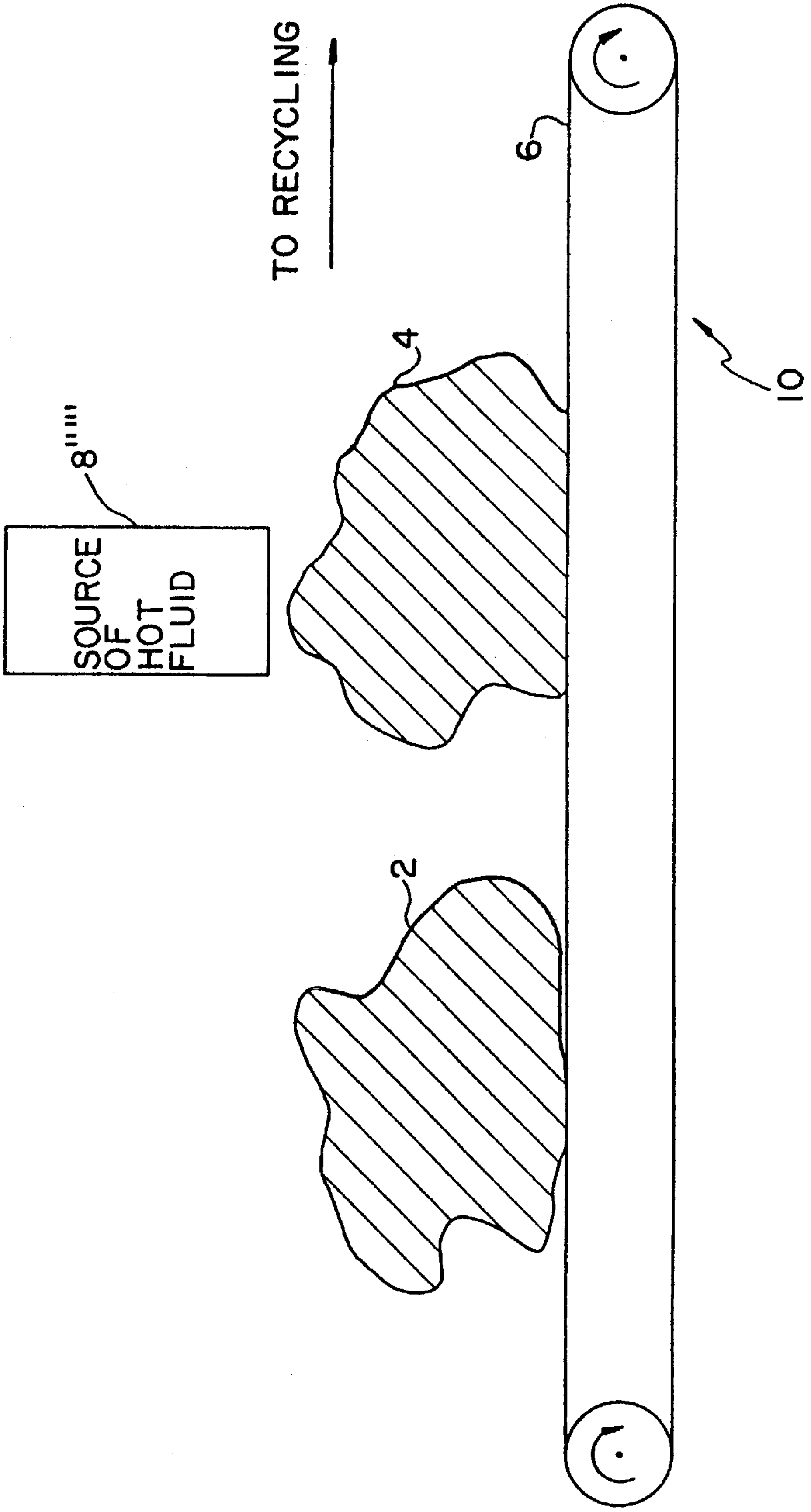

The instant invention opens bags in a way that does not exert dynamic forces on the bags. In this way the invention eliminates damage to recyclables. The contents of the bags are then emptied in a manner that also minimizes dynamic forces on the bags and results in partial separation of the bag contents. This further minimizes glass breakage and other damage to recyclables and permits subsequent efficient recovery of the recyclables while preserving the value of the recovered recyclables.

This partial separation permits some presorting of recyclables, for example by handpicking, prior to entering recovery machinery, thus further improving the efficiency and ease of recovery downstream in the sorting and recovery process.

A major advantage to the user of household plastic waste bags is that the bags are specifically designed to resist tearing and rupture. The bag manufacturers vigorously develop and promote the ability of their bags to resist tearing and rupture. Conventional techniques for opening bags attempt to tear and/or rupture the bags thereby working against a major design feature of the bags.

In the instant invention, bags are opened by applying concentrated heat to the bag wall to melt the bag wall in order to weaken the wall and cause the bag wall to separate. Thus, the invention takes advantage of a bag's inherent weakness to heat. The term "bag(s)" as used in this application is not limited to plastic residential garbage bags, but rather encompasses any type of heat-meltable container that contains recyclable material.

FIG. 1(*a*) illustrates a side view of a bag opener according to a first preferred embodiment of the invention. FIG. 1(*a*) shows a bag opener 10 for opening bags 2 and 4. The bag opener 10 includes a source of heat 8 and an assembly 6 that brings bags 2 and 4 into the vicinity of the source of heat 8. In FIG. 1(*a*), bags 2 and 4 are moving from left to right. The source of heat 8 produces heat sufficient to melt the bags 2 and 4 when the bags are brought into the vicinity of the source of heat. In FIG. 1(*a*), the assembly 6 is shown to be a conveyor that moves the bags past the source of heat 8; however, the assembly can consist of any arrangement that brings the bags into the vicinity of the source of heat.

The source of heat 8 can be a heated rod or other heated member (to be discussed in detail below in connection with FIGS. 3 to 6), a heated wire 8' (shown in FIG. 1(*b*), or other heated structure. Alternatively, the source of heat can be a source of directed and/or concentrated electromagnetic radiation 8'' (shown in FIG. 1(*c*), such as a source of focused cfoncentrated light beams, laser beams 8''' (shown in FIG. 1(*d*) or infrared beams 8''''(shown in FIG. 1(*e*). Heat can also be delivered to the bag wall by a heated fluid from a source of hot fluid 8''''' (shown in FIG.1(*f*)), such as steam, or hot air or another gas.

After the bags are opened, the contents of the bags are sorted and the recyclable contents are recovered for use in making new products. Examples of suitable sorting and recovery systems are described in detail in U.S. Pat. No. 4,533,053, issued to Kenny et al.; U.S. Pat. No. 4,533,054, issued to Sommer, Jr. et al.; U.S. Pat. No. 4,541,530, issued to Kenny et al.; U.S. Pat. No. 4,718,559, issued to Kenny et al.; U.S. Pat No. 4,031,004, issued to Sommer, Jr. et al.; and U.S. Pat. No. 4,069,145, issued to Sommer, Jr. et al.. All six of these patents are incorporated herein by reference.

Figure 2:
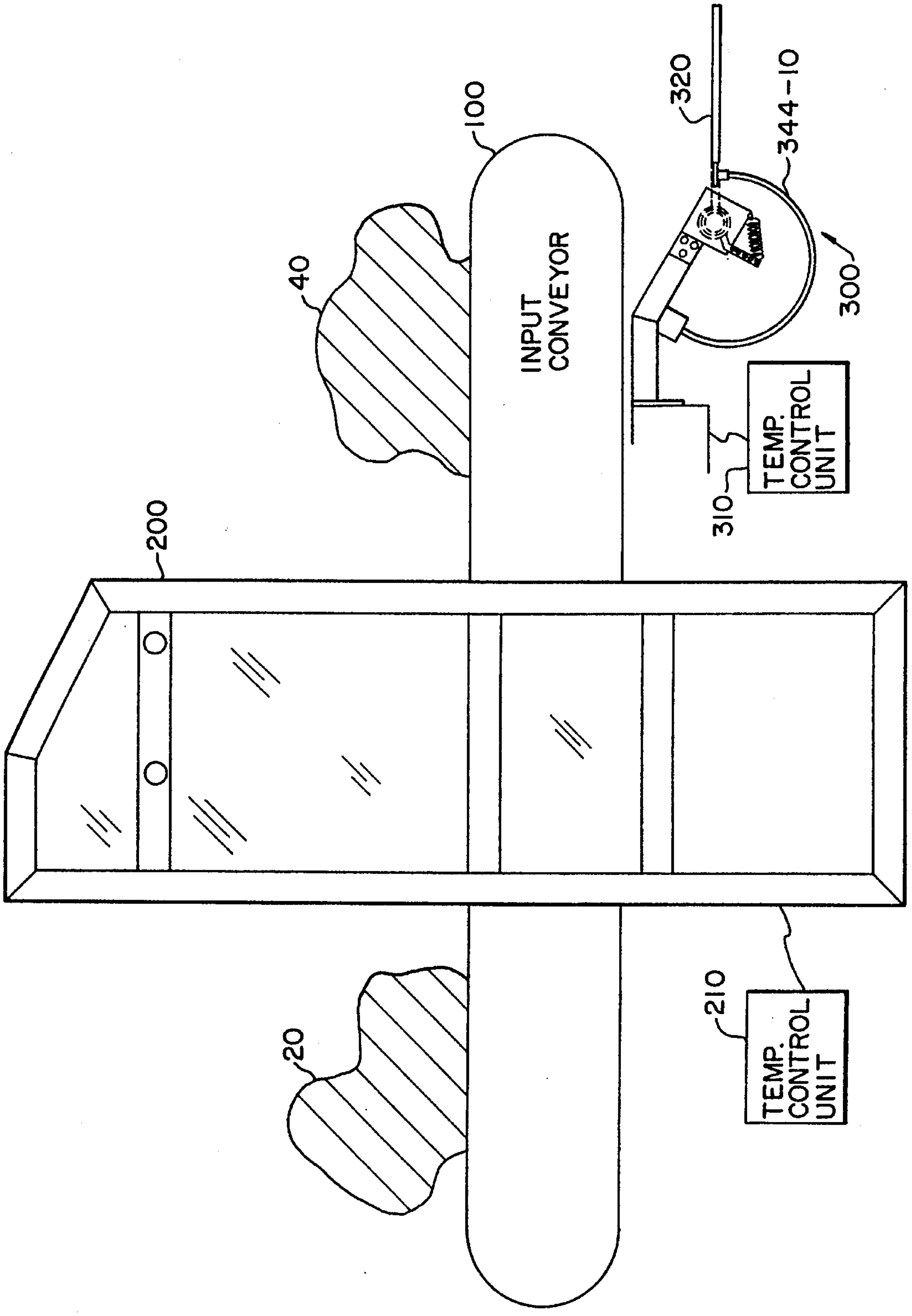
FIG. 2 illustrates a side view of a bag opener according to a second preferred embodiment of the invention.
Figure 3:
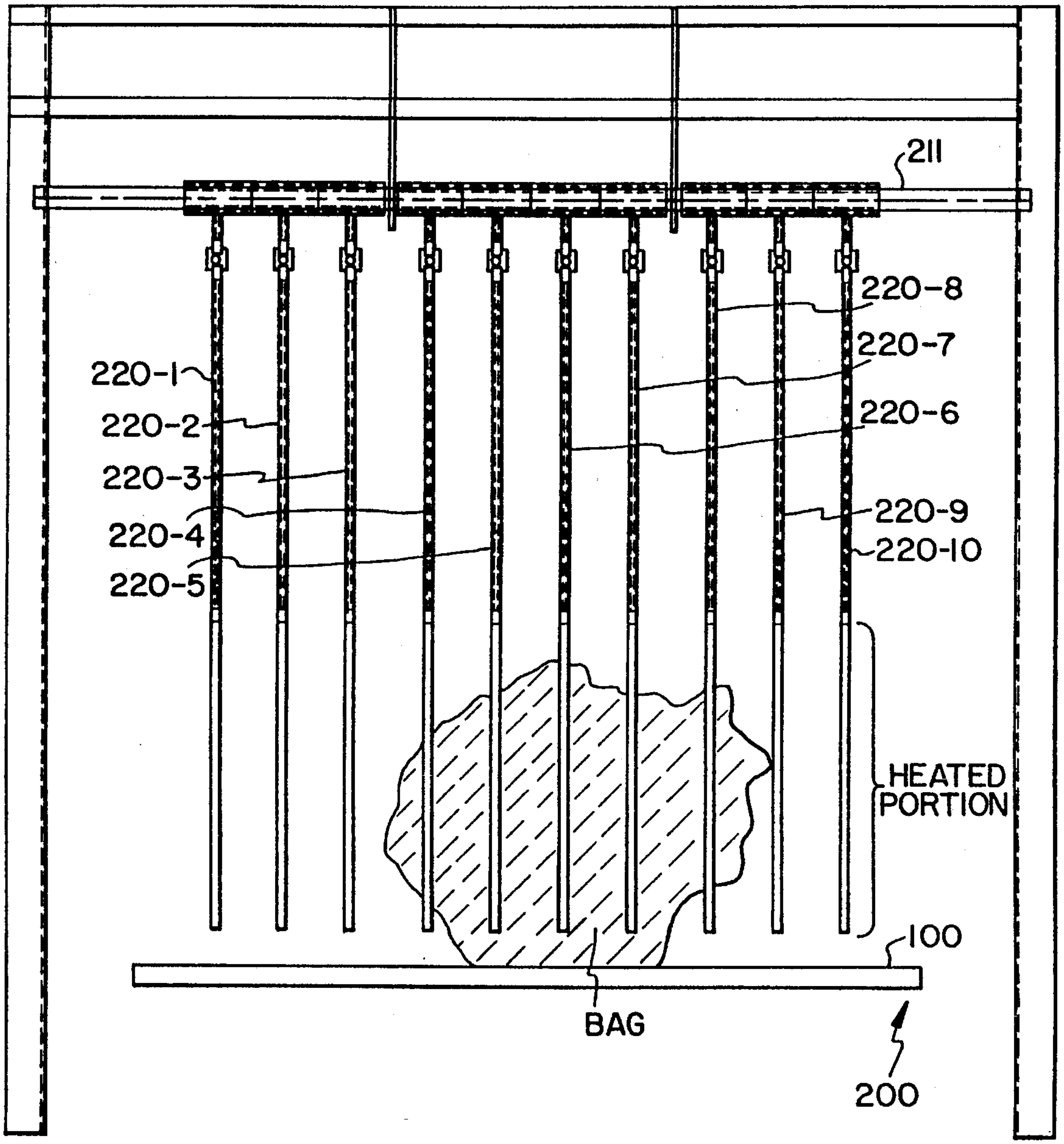
FIG. 3 illustrates an end view of the second preferred embodiment of the invention.
Figure 4:
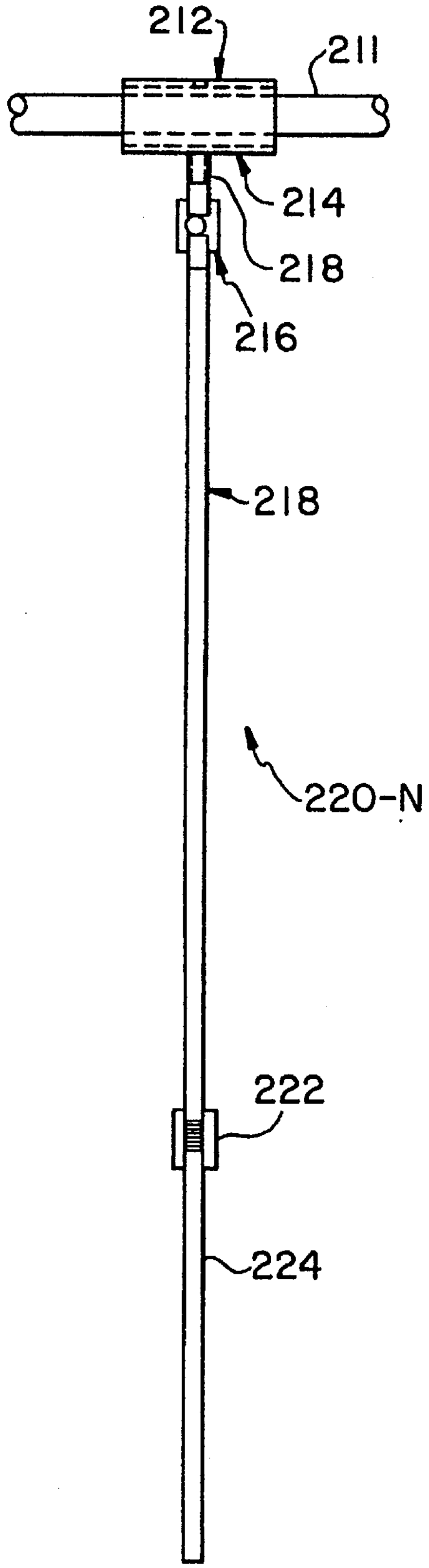
FIG. 4 illustrates a close-up view of a heated member of the second preferred embodiment.
Figure 5:
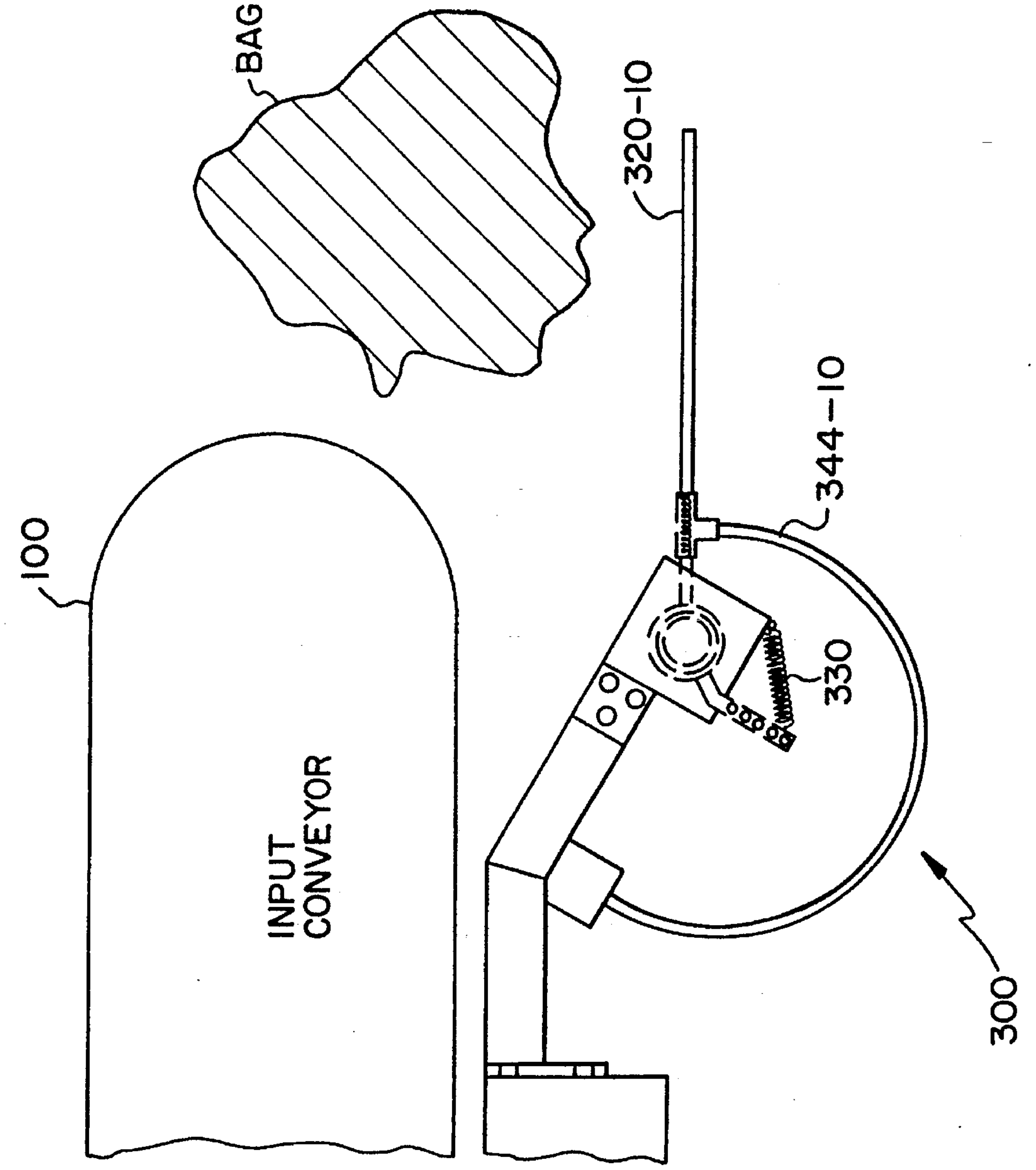
FIG. 5 illustrates a close-up view of a second opening station of the second preferred embodiment.
Figure 6:
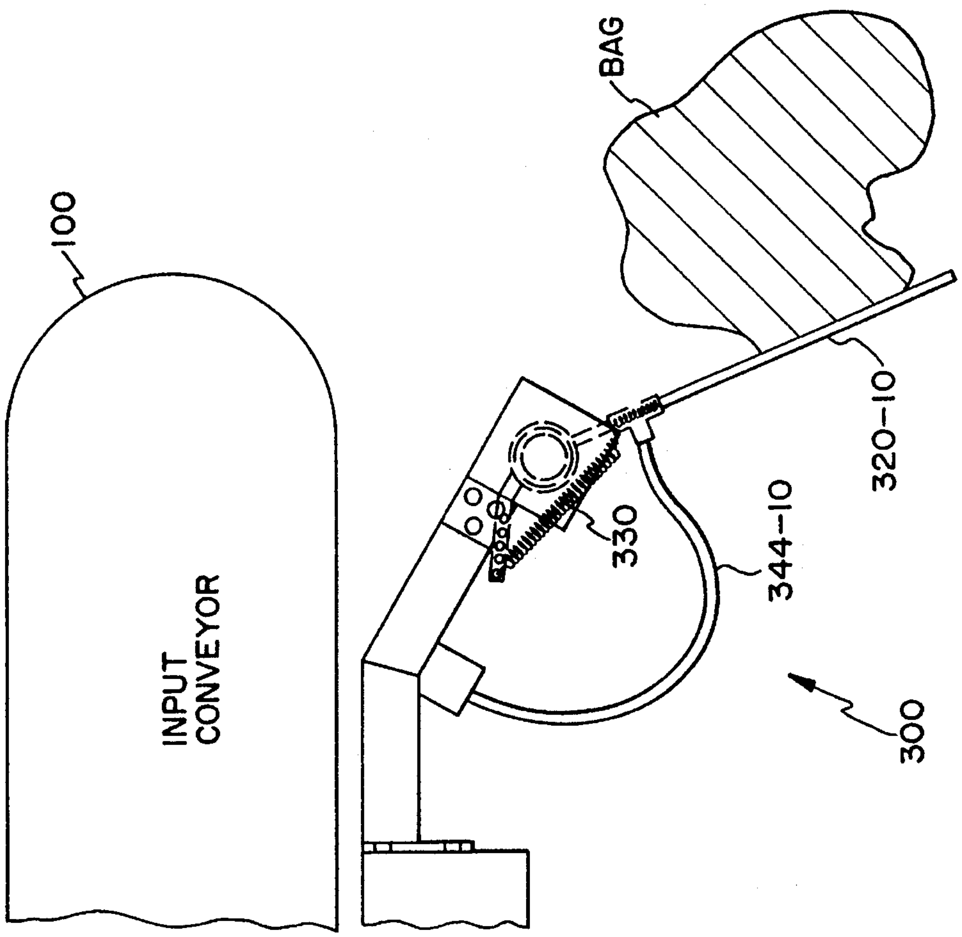
FIG. 6 illustrates another close-up view of the second opening station of the second preferred embodiment.

FIGS. 2 through 6 illustrate a bag opener according to a second preferred embodiment of the invention. FIG. 2 illustrates a side view of the second preferred embodiment. FIG. 3 illustrates an end view of the second preferred embodiment. FIG. 4 illustrates a close-up view of a heated member of the second preferred embodiment. FIG. 5 illustrates a close-up view of a second opening station of the second preferred embodiment and FIG. 6 illustrates another close-up view of the second opening station of the second preferred embodiment.

The second preferred embodiment, as illustrated in FIG. 2, includes a conveyor 100 which first conveys bags 20 and 40 past a first opening station 200 to open one side of the bags and then conveys the bags past a second opening station 300 to open another portion of the bags as the bags fall off of the conveyor 100. Additional opening stations can be provided if necessary for a particular application or installation.

FIG. 3 illustrates an end view of the first opening station 200. As illustrated in FIG. 3, the first opening station 200 includes, as a source of heat, electrically heated members 220-1 through 220-10 suspended above conveyor 100. Members 220-1 through 220-10 contact the plastic bags as the bags are conveyed through first opening station 200. Members 220-1 through 220-10 contact the bags and melt slits into the bag walls as the bags pass under the members.

FIG. 4 illustrates a close-up view of a heated member 220-N of the second preferred embodiment. Each heated member is suspended from a 1½" pipe 211 via a 2" pipe 214. Pipe 214 fits around pipe 211 and is provided with a grease fitting 212. A ⅜ pipe 218 hangs from pipe 214. The length of pipe 218 is approximately 2'. A heating element 224 is connected to the end of pipe 218, via coupling 222, and serves as a heat source. A suitable heating element is manufactured by Watlow Corporation, St. Louis, Mo., USA. Each heating element 224 is electrically connected to temperature control unit 210 via a cable 244 (not shown in the figs) which passes through a ⅜ tee 216. The particular arrangement for supporting the heated member(s) will vary depending on the particular installation and is not limited to the arrangement shown in the figures.

The resulting openings in the bags are in the form of slits across the breadth or width of the bags. Each individual bag is slit multiple times because multiple heated members contact each bag. Although FIG. 3 shows the members suspended above the bags, the members can be positioned to contact the bags from below the conveyor or from the sides of the conveyor as long as the members do not impede the flow of bags past the opening station.

The temperature of members 220-1 through 220-10 is adjustable and is maintained by temperature control unit 210. In the second preferred embodiment, a closed-loop electronic feedback circuit is used for the temperature control unit 210. Suitable temperature control units are available from Omega Corporation, Stamford, Conn., USA. Temperature sensing devices within heating element 224 provide temperature information to the temperature control unit 210. The temperature of the members is high enough to melt the bags but safely below the autoignition temperature of common flammable substances, such as solvents and paper products, which might be in the bags. In the preferred embodiment, the temperature is controlled to be about 420° F.

The design of the first opening station provides for the removal of melted plastic residue on the heated members. As waste materials pass through the heated members the waste materials scrape against the heated members, thus removing melted plastic residue from the surfaces of the members.

The temperature control unit 210 can be programmed to periodically effect more intense cleaning by automatically and electronically elevating the temperature of the members 220-1 through 220-10 to a temperature sufficient to burn off residue during periods when bags are not being opened. When this intense cleaning is completed, the members are returned to their normal operating temperature.

Fumes and smoke from the heated members and the substances they contact are continuously removed via a fume hood, duct work, and/or an exhaust fan not shown in the figs.).

After a bag passes through the first opening station 200 it passes on to second opening station 300. In some applications the second opening station 300 is not required and therefore need not be provided.

The design of the second opening station 300 in the second preferred embodiment is shown in FIGS. 5 and 6. As shown in FIGS. 5 and 6, the second opening station 300 is similar to the first opening station 200 and includes spring-mounted heated members 320-1 through 320-10. In FIGS. 5 and 6, heated members 320-1 through 320-9 are hidden behind heated member 320-10. The second opening station 300 also includes a temperature control unit 310 which is similar to the temperature control unit 210 of the first opening station 200. In the preferred embodiment, the same physical temperature controller is used for both temperature control unit 210 and temperature control unit 310 to minimize costs. The second opening station 300 melts slits into the bags as the bags fall off of conveyor 100. The heated members 320-1 through 320-10 are spring-mounted mounted by spring(s) 330 and thus give way when the bags fall, as shown in FIG. 6. Because the portion of a bag contacting the heated members of the first opening station 200 is different from the portion of the bag contacting the heated members of the second opening station 300, the second opening station serves to provide slits in a different portion of the bag. This makes it easier to empty the bags after they have been opened.

Figure 7:
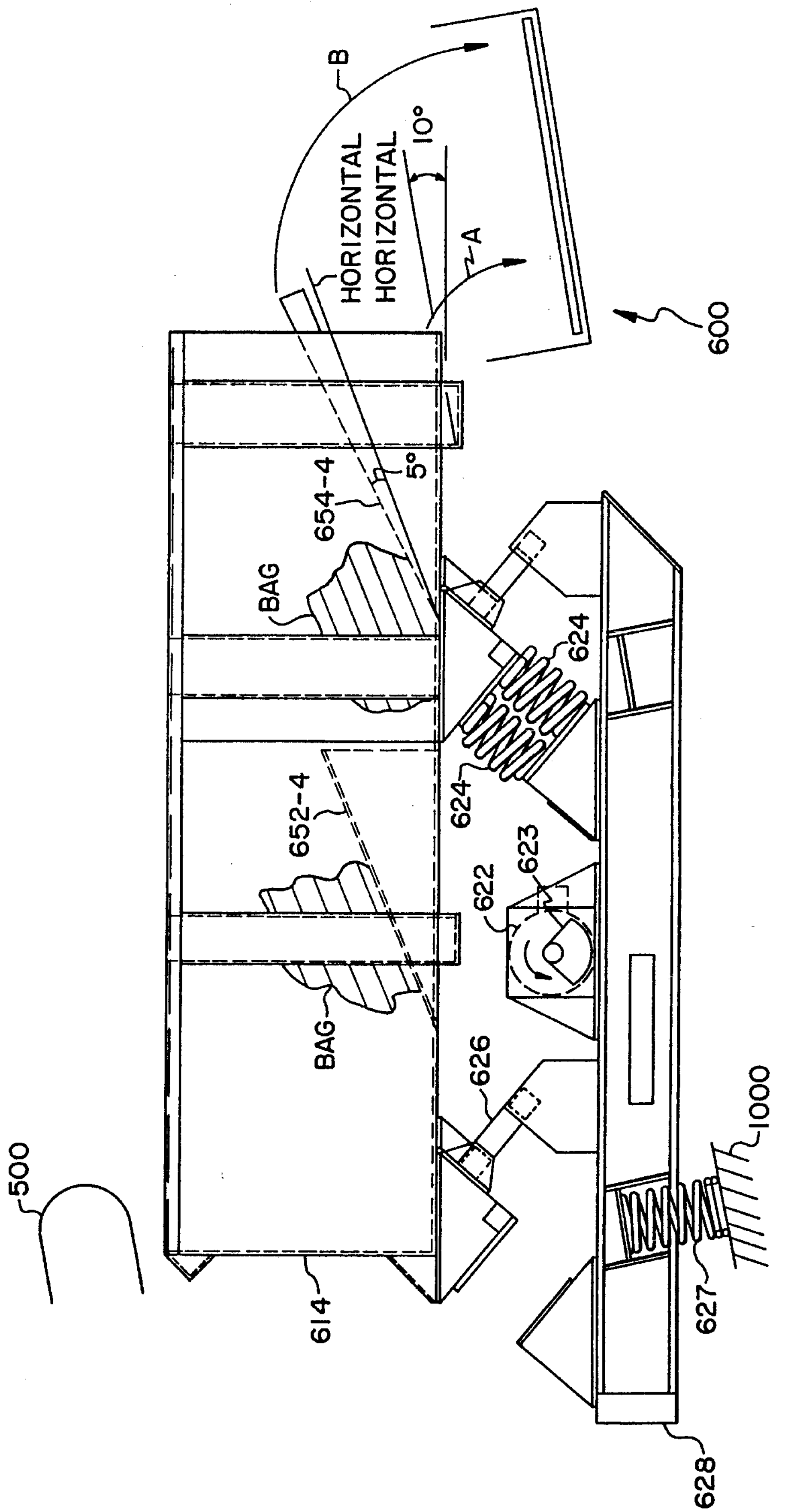
FIG. 7 illustrates a side view of a bag emptier for use in conjunction with the bag openers illustrated in FIGS. 1(*a*) through 6.
Figure 8:
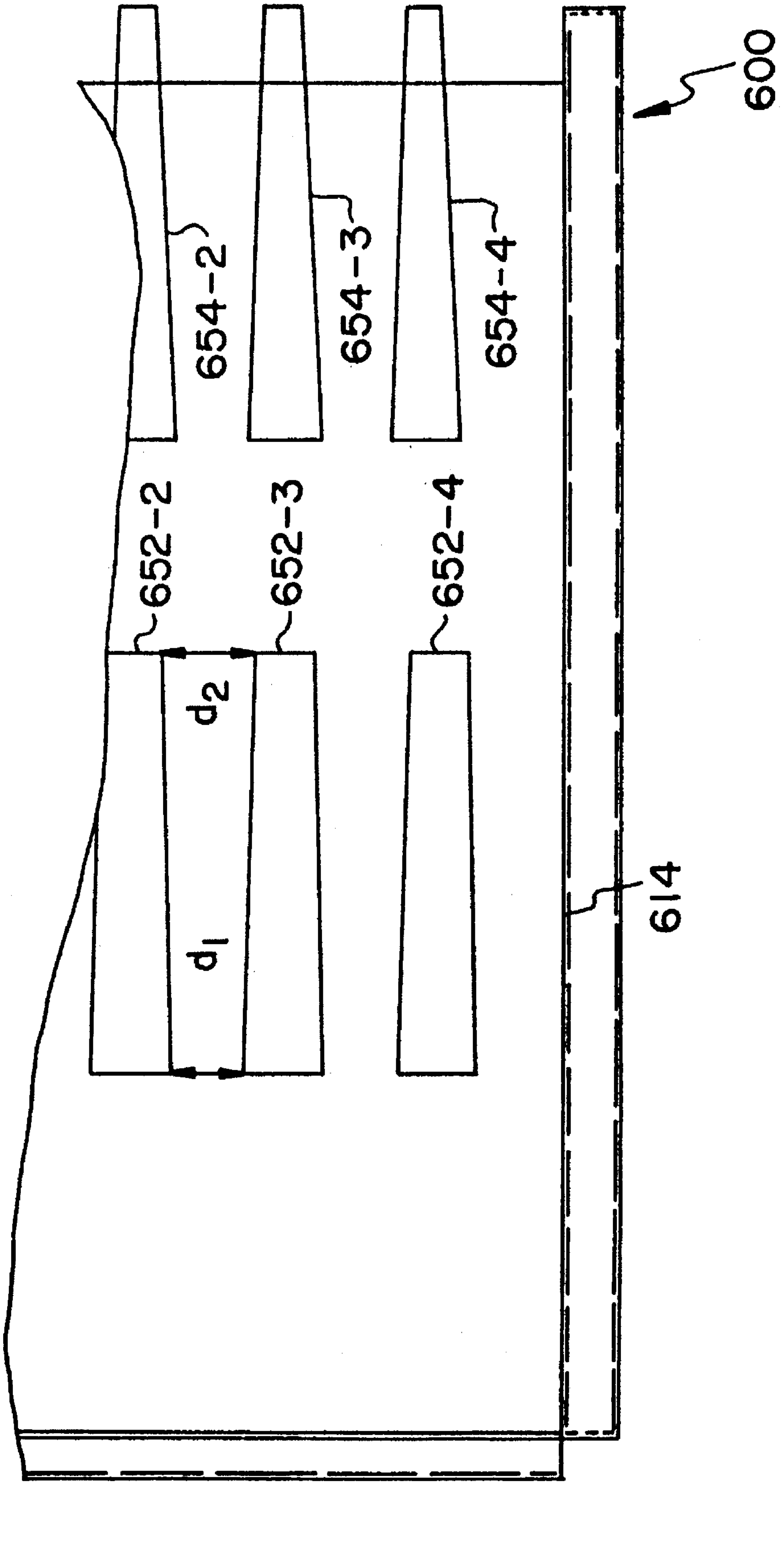
FIG. 8 illustrates a partial plan view of the bag emptier of FIG. 7.
Figure 9:
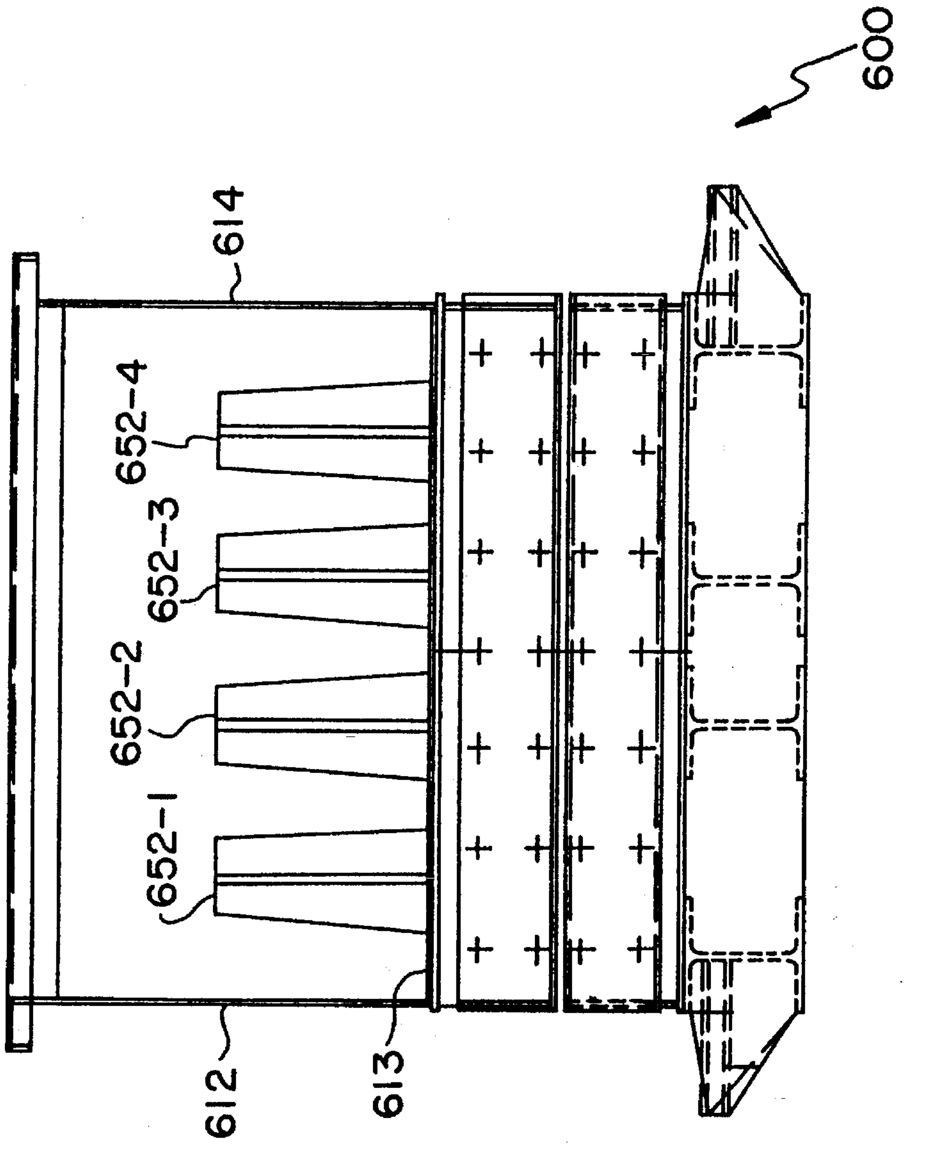
FIG. 9 illustrates an end view of the bag emptier of FIG. 7.

After the plastic bags are opened by the bag opener, the bags are conveyed to a bag emptier which mechanically empties the contents of the bags so that the contents can be processed. FIGS. 7 through 9 illustrate a bag emptier 600 suitable for use in conjunction with the bag openers illustrated in FIGS. 1(*a*) through 6 or other bag openers. FIG. 7 illustrates a side view of bag emptier 600. FIG. 8 illustrates a partial plan view of bag emptier 600. FIG. 9 illustrates an end view of the bag emptier 600.

The bag emptier 600 consists of a declined (with respect to horizontal) three-sided trough formed by a bottom section 613 and side sections 612 and 614. The trough is attached to a vibratory drive unit consisting of a motor 622 which rotates an eccentric weight 623 attached to the shaft of the motor, drive springs 624, and stabilizer springs 626. A series of narrow flat-topped ramps 652 and 654 are located within the trough.

The trough, the motor 622, the eccentric weight 623, drive springs 624, stabilizer springs 626, and the series of narrow flat-topped ramps 652 and 654 are all supported by a bedplate 628. The bedplate 628 is in turn resiliently connected to a rigid structure 1000, such as the floor of a building. As the motor 622 rotates, the entire bedplate 628 vibrates due to the eccentric loading on the motor shaft. This vibration causes the bags and bag contents to actually travel uphill along ramps 652 and 654. In the preferred embodiment, the ramps are inclined upward at an angle of approximately 5° with respect to horizontal.

In operation, the opened (but full) bags are conveyed to the bag emptier 600 via a conveyor 500 and are placed in the trough. When the opened bags are placed in the trough the vibratory action causes the bags and the bag contents to be lifted up the narrow flat-topped ramps 652 and 654. During this process, the small contents of the bags are literally shaken out through the slits in the bags and the small contents fall to the bottom of the trough and are conveyed to output conveyor 700 via path A, illustrated in FIG. 7. Conveyor 700 in turn leads to either a hand-picking station or to an automated separation system or both.

The spacing between the ramps gets wider as the bags and waste traverse the ramps. This feature is illustrated in FIG. 8. In FIG. 8, the bags and waste travel from left to right, first over the first set of ramps 652-1 through 652-4 and then over the second set of ramps 654-1 through 654-4. The spacing $d_1$ between ramps 652-2 and 652-3 where the bags and waste first encounter ramps 652-2 and 652-3 is less than the spacing $d_2$ between the ramps where the bags and waste leave ramps 652-2 and 652-3.

Thus, the spacing between the ramps 652 and 654 is selected such that the smaller items in the bags, such as cans and bottles, fall between the ramps, travel along the bottom of the trough, and end up on the left side of conveyor 700 via path A. On the other hand, the bulkier items, such as cardboard, remain on ramps 654 until the ends of the ramps are reached and then fall on to the right side of conveyor 700.

Thus, the design of the ramps results in partial separation of the waste by size and/or type while the bags are being emptied. This partial separation early on allows more efficient recovery of the recyclable materials in subsequent processing. This design also minimizes jamming of materials between the ramps.

Figure 10:
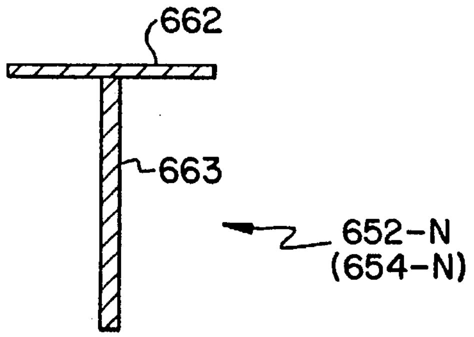
FIG. 10 illustrates a cross sectional view of a bag emptier ramp.

FIG. 10 illustrates a cross sectional view of a ramp. Each ramp consists of a vertical plate 663 and a flat-top plate 662. The flat-top plate 662 assists in the transport of bags through the emptier. Without the flat-top plate (i.e., with just the vertical plate 663), the bags tend to drape over the ramps 652 and 654 and slow down their forward motion, thus causing material jams.

Figure 11:
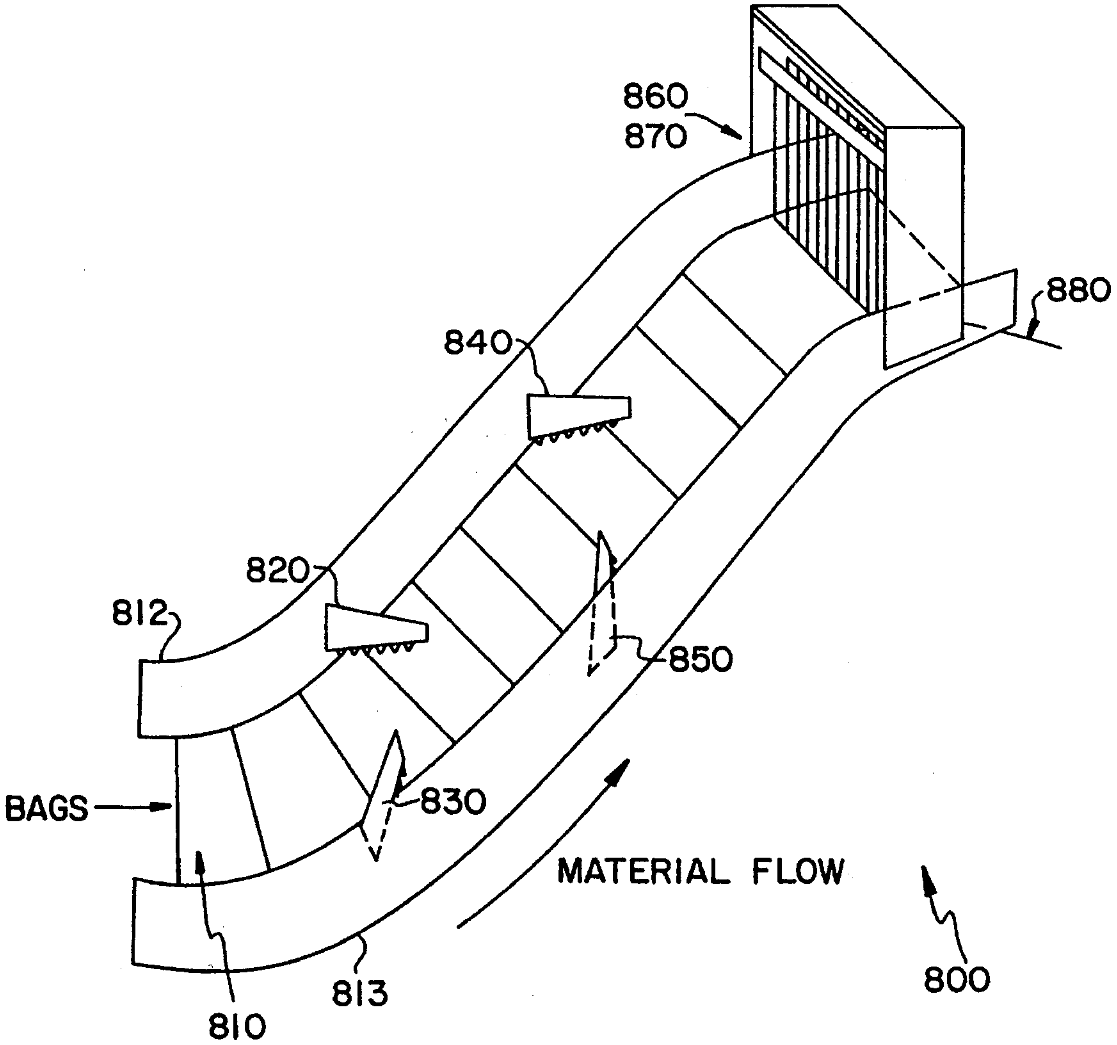
FIG. 11 illustrates a perspective view of a bag opener according to a third preferred embodiment of the invention.

FIG. 11 illustrates a perspective view of a bag opener 800 according to a third preferred embodiment of the invention. As illustrated in FIG. 11, the bag opener 800 includes an input conveyor 810 which receives bags and/or other materials at the left-hand side of FIG. 11 and conveys the bags and/or other materials past a series of load levelers 820, 830, 840, and 850. The load levelers even out materials on conveyor 810 to make subsequent processing easier and more effective. As will be described in further detail below in conjunction with FIGS. 12 and 13, the load levelers 820, 830, 840, and 850 partially open bags on conveyor 810 using heated teeth. After material is leveled out and the bags are partially opened by load levelers 820, 830, 840, and 850, the bags proceed to two sets of above-conveyor heated members 860 and 870, which are similar to the set of heated members illustrated in FIG. 3, and then to a set of below-conveyor heated members 880, which is similar to the set of heated members illustrated in FIGS. 5 and 6.

Figure 12:
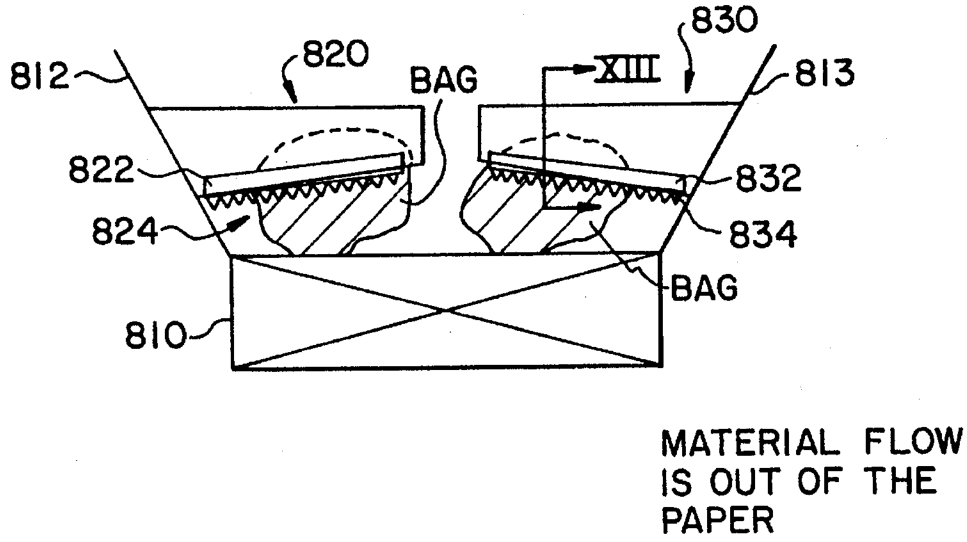
FIG. 12 illustrates an end view of the third preferred embodiment.

FIG. 12 is an end view of the third preferred embodiment, illustrating conveyor 810, conveyor sidewalls 812 and 813, and load levelers 820 and 830. Load levelers 820 and 830 include heat sources 822 and 832, respectively, and heated teeth 824 and 834, respectively.

Figure 13:
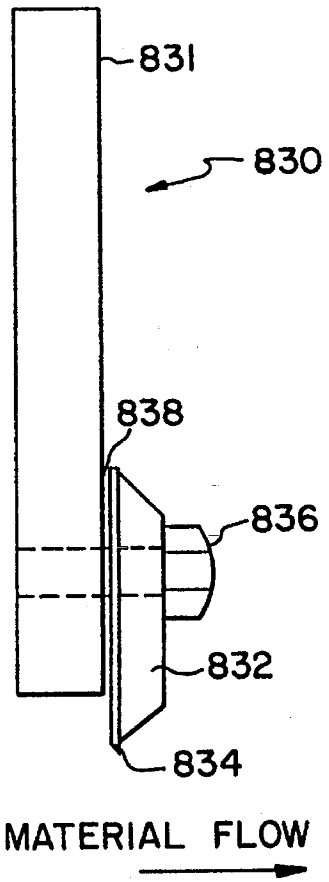
FIG. 13 illustrates a close-up view of the third preferred embodiment.

FIG. 13 is a close-up sectional view of load leveler 830, illustrating heat source 832 which heats heated teeth 834. Heat source 832 and heated teeth 834 are secured to a plate 831 by a fastener 836. Insulation 838 is provided between heated teeth 834 and plate 831.

Although the invention has been described above with respect to certain specific embodiments, the scope of the invention is not limited to the specific embodiments described above. Other designs within the spirit and scope of the invention will be apparent to those skilled in the field after receiving the above teachings. The invention, therefore, is defined by the following claims.

What is claimed is:

1. A method of opening a sequence of bags having a non-uniform external contour and containing recyclable waste materials, said method comprising the steps of:

(a) providing a source of heat sufficient to melt said bags having said non-uniform external contour without mechanically contacting said bags; and (b) conveying said sequence of bags having said non-uniform external contour past said source of heat to open said bags having said non-uniform external contour to expose said recyclable waste materials;

wherein said source of heat is spaced apart from said bags and includes a laser directed at said bags.

2. A method of opening a sequence of bags having a non-uniform external contour and containing recyclable wste materials, said method comprising the steps of:

(a) providing a source of heat sufficient to melt said bags having said non-uniform external contour without mechanical members contacting said bags; and (b) conveying said sequence of bags having said non-uniform external contour past said source of heat to open said bags having said non-uniform external contour to expose said recyclable waste materials;

wherein said source of heat is spaced apart from said bags and includes a source of hot fluid which is directed at and impacts said bags.

* * * * *